United States Patent [19]
Glasmacher

[11] 4,400,699
[45] Aug. 23, 1983

[54] PROGRAM SELECTION APPARATUS

[75] Inventor: Peter Glasmacher, Munich, Fed. Rep. of Germany

[73] Assignee: G. Bauknecht GmbH, Stuttgart, Fed. Rep. of Germany

[21] Appl. No.: 245,406

[22] Filed: Mar. 19, 1981

Related U.S. Application Data

[63] Continuation-in-part of Ser. No. 63,633, Aug. 2, 1979, abandoned.

[30] Foreign Application Priority Data

Aug. 4, 1978 [DE] Fed. Rep. of Germany ....... 2834351

[51] Int. Cl.³ .................. G05B 11/32; G06F 15/02
[52] U.S. Cl. .................. 340/825.22; 340/365 C; 340/309.4; 307/141
[58] Field of Search .......... 340/825.22, 309.4, 365 C; 307/141; 364/140, 143, 146, 147, 183, 185, 188, 189; 235/92 CA

[56] References Cited

U.S. PATENT DOCUMENTS

| 4,001,599 | 1/1977 | Karklys | 307/141 |
|---|---|---|---|
| 4,035,237 | 7/1977 | Carlson | 307/141 |
| 4,079,234 | 3/1978 | Kashio | 235/92 CA |
| 4,084,237 | 4/1978 | Beachem | 307/141 |
| 4,104,542 | 8/1978 | Karklys | 307/141 |
| 4,110,632 | 8/1978 | Wyland | 307/141 |
| 4,137,463 | 1/1979 | Scott | 307/141 |
| 4,158,432 | 6/1979 | van Bavel | 340/309.4 |
| 4,241,400 | 12/1980 | Kiefer | 307/141 |
| 4,245,296 | 1/1981 | Small et al. | 364/146 |
| 4,293,915 | 10/1981 | Carpenter et al. | 364/146 |

OTHER PUBLICATIONS

"Omron's Programmable Controllers Meet Optimum Control Requirements", Kousaku Arahata, JEE, Jan. 1981, vol. 18, No. 169, pp. 79–83.

Primary Examiner—Donald J. Yusko
Attorney, Agent, or Firm—Edwin E. Greigg

[57] ABSTRACT

This invention relates to a program selection apparatus for program-controlled household appliances, such as washing machines in particular, which have a numeral keyboard for the input of program specifications and which have a display device coupled therewith via a control device for a continuous display of the program specifications inputted in sequence via the various keys of the numeral keyboard.

5 Claims, 7 Drawing Figures

Fig. 2

Fig. 3
TABLE OF PRESETS AND LOCKS

LEGEND:
- X — SELECTABLE
- • — BLOCKED
- ○ — PRESET

"END OF RINSE" AND "STANDARD SPIN" HAVE NO CODED NUMBER

PRIMARY PROGRAMS (rows) vs TEMPERATURE and ADDITIONAL FUNCTIONS (columns)

| Primary Program | Temp MIN | Temp MAX | Temp PRESET | 01 Boiling Cycle | 02 Delicate Boiling Cycle | 03 Colored Clothes | 04 Wash/Wear Cycle | 05 Delicate Cycle | 06 Wool | 07 No Presoak | 08 Intensive | 09 Saver Cycle | 10 Soaking | 11 Rinse & Spin | 12 Rinse | End of Rinse | 13 Empty | 14 Short Spin | 15 Wool Spin Cycle | 16 Low Speed Spin | Standard Spin |
|---|---|---|---|---|---|---|---|---|---|---|---|---|---|---|---|---|---|---|---|---|---|
| 00 CLEAR (basic state) | 0 | 0 | 0 | X | X | X | X | X | X | X | X | X | X | X | X | | X | X | X | X | |
| 01 Boiling Cycle | 60 | 95 | 95 | ○ | • | • | • | • | • | X | X | X | • | • | • | ○ | • | • | • | • | ○ |
| 02 Delicate Boiling Cycle | 60 | 95 | 95 | • | ○ | • | • | • | • | X | X | X | • | • | • | ○ | • | • | • | • | ○ |
| 03 Colored Clothes | 30 | 60 | 60 | • | • | ○ | • | • | • | X | X | X | • | • | • | ○ | • | • | • | • | ○ |
| 04 Wash/Wear Cycle | 30 | 60 | 60 | • | • | • | ○ | • | • | X | X | X | • | • | • | ○ | • | • | • | • | ○ |
| 05 Delicate Cycle | 20 | 40 | 40 | • | • | • | • | ○ | • | X | X | X | • | • | • | ○ | • | • | • | • | ○ |
| 06 Wool | 20 | 40 | 30 | • | • | • | • | • | ○ | X | X | X | • | • | • | ○ | • | • | • | • | ○ |
| 10 Soaking | 40 | 60 | 40 | • | • | • | • | • | • | • | • | • | ○ | • | • | ○ | • | • | • | • | |
| 11 Rinse & Spin | 0 | 0 | 0 | • | • | • | • | • | • | • | • | • | • | ○ | • | ○ | • | • | • | • | ○ |
| 12 Rinse | 0 | 0 | 0 | • | • | • | • | • | • | • | • | • | • | • | ○ | ○ | • | • | • | • | ○ |
| 13 Empty | 0 | 0 | 0 | • | • | • | • | • | • | • | • | • | • | • | • | | ○ | • | • | • | |
| 14 Short Spin | 0 | 0 | 0 | • | • | • | • | • | • | • | • | • | • | • | • | | • | ○ | • | • | |
| 15 Wool Spin Cycle | 0 | 0 | 0 | • | • | • | • | • | • | • | • | • | • | • | • | | • | • | ○ | • | |
| 16 Low Speed Spin | 0 | 0 | 0 | • | • | • | • | • | • | • | • | • | • | • | • | | • | • | • | ○ | |

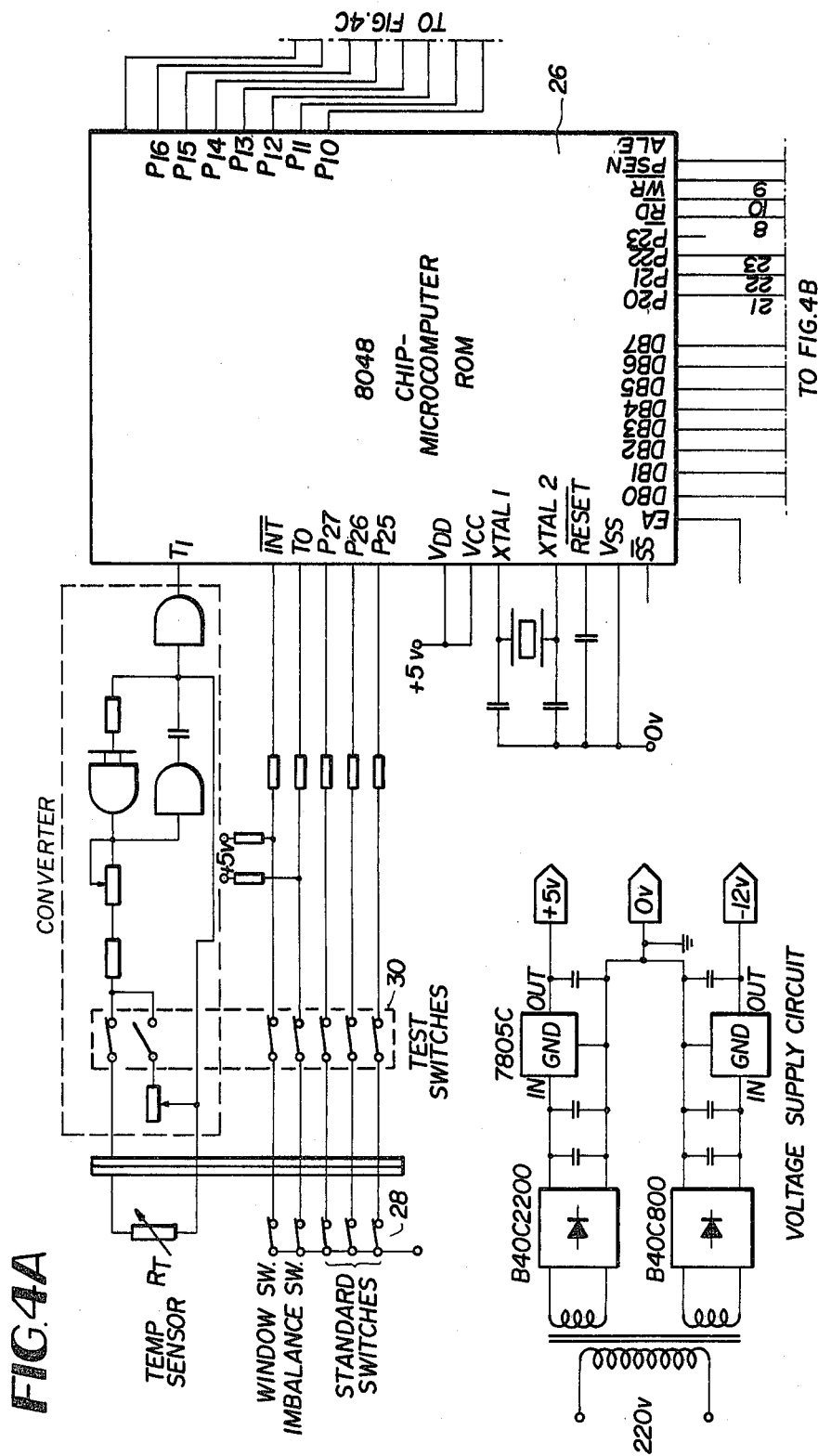

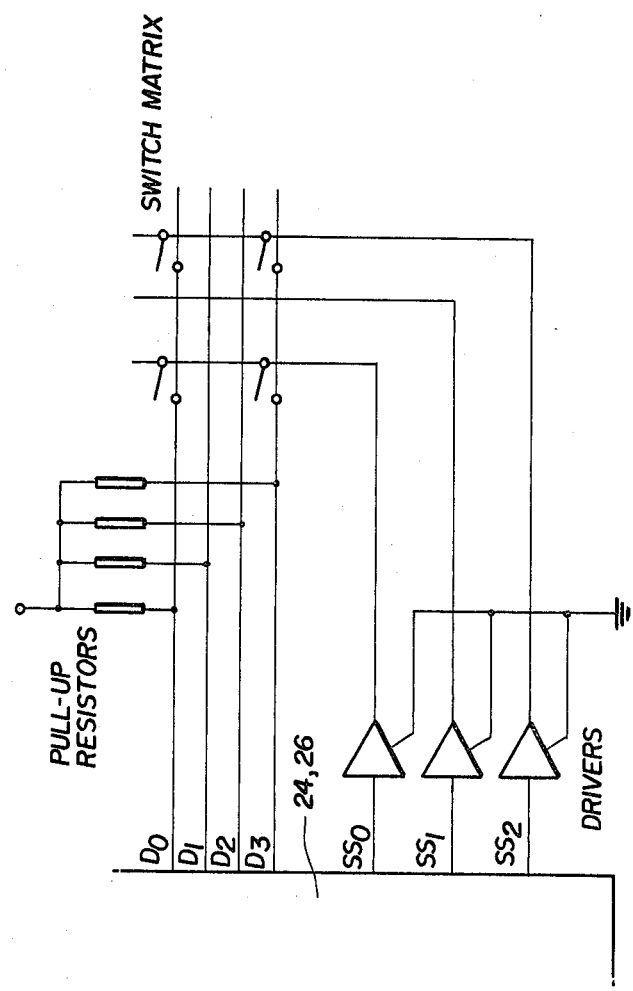

PROGRAM SELECTION APPARATUS

This application is a continuation-in-part of application Ser. No. 06/063633 filed Aug. 2, 1979 and now abandoned.

BACKGROUND OF THE INVENTION

In program-controlled household appliances of the type to which the invention is directed, which include not only washing machines, but also clothes dryers, dishwashers and microwave ovens as further examples, the course of operation encompasses numerous individual steps, each of which may vary, usually in a multiplicity of parameters. This results in numerous possible programs, among which one optimal selection must be made at any particular time. Despite this, the program selection must not require excessive expense for functional components nor a training period, of any length worth mentioning, for the user of the appliance.

In German Auslegeschrift No. 26 50 964, a program input device is described for electronic control devices, which permits the setup of a machine program which comprises a plurality of program sets which are performed in sequence. This programming, as provided for in this known device, is accomplished with the aid of addresses encoded as numerals on a display board which is integral with the device. First, the code for the first program set is read off on the associated display board. Then an appropriate address key is pressed and simultaneously, via a separate numeral keyboard, the appropriate numerical code is inputted. This numerical code is then displayed in numerical form by means of a luminous indicator associated with the particular address key. The next subsequent address key is thereupon pressed for a further program set and the appropriate numerical code is inputted via the numeral keyboard, which code is then also displayed. The programming is continued in this manner until all the digit locations for all the program sets are occupied or programmed in.

Such a programming method does offer a high degree of freedom of choice in setting up programs. However, this is attained at a very high cost for the functional components in the form of a double keyboard with address keys on the one hand and a numeral keyboard on the other. Beyond this there is no security against programming errors, so that the user of the appliance first must become experienced in the programming and second must always pay close attention to what he is doing. Both these requirements, however, run diametrically counter to the desire for a largely automatic mode of operation such as a typical for the household appliances with which the invention is associated.

OBJECT AND SUMMARY OF THE INVENTION

It is accordingly a principal object of the invention to provide a program selection apparatus which can effect program selection for the operation of the household appliance equipped therewith which is always optimal and error-free, which permits the least possible expenditure for the functional components and which does not require particularly close attention on the part of the user of the appliance.

This object is attained according to the invention, first, in that the numeral keyboard represents the single input device for the program specifications, which are encoded as a multiple-digit code number always having the same number of digits, the numeral keyboard also being connected via the control device with a single transducer. Second, in that the control device, upon the input of a further coded number digit which is not compatible, in the context of the programmability of the associated household appliance, with coded number digits already inputted via the numeral keyboard and displayed via the display device, triggers an actuation of the signal transducer and does not permit the newly inputted coded number digit to become effective for the program selection.

The program selection apparatus constructed in accordance with the invention is not only advantageous as to the cost of manufacture, but also is entirely reliable in its operation. The doubled indication provided, according to the invention, in the event of a possible input error, that is, both via the display device and via the signal transducer, offers the further advantage that the incorrect input not only remains without any undesirable effect on the course of operation but also can easily be recognized and corrected.

The program selection apparatus constructed in accordance with the invention permits the selection, with the aid of an input keyboard with ten keys for the numerals 0 through 9, of all the necessary basic programs for an automatic washing machine, for example, and, furthermore, permits the selection of additionally desirable parameters for additional functions and final treatments as well as for individual preset temperatures. The household appliance with which this invention is associated can be separated completely from the electrical supply grid via an additional key and thus can be turned off, which simultaneously results in clearing the particular program setting present at that time.

In the program selection, the coded numbers 01 through 08 may be associated with basic programs and the coded numbers 09 through 12 may be associated with additional functions, while the coded numbers 13 through 18 correspond to final treatments and 19 through 95 may indicate present temperatures.

During inputting, the various coded numerals are continuously checked optically and, in the event that further parameters for additional functions or final treatments or temperature presets are chosen which do not agree with the basic program already selected, there is first a suppression of this data for appliance operation and, second, a signal indication which makes the appliance user aware of his error in program selection. Instead of the incorrectly selected parameter, such as a temperature preset which does not suit an already selected program, the standard setting which corresponds to the selected program is automatically maintained for the subsequent course of operation.

From an overall standpoint, the invention permits simple and error-free setting of household appliances with program-controlled courses of operation. It may be taken as a fundamental principle of the invention that a reaction follows each input action of the appliance user and thus a continuous contact is maintained with the appliance user, which precludes incorrect settings and furnished continuous information as to the status of the effective program of the household appliance, thus furnishing a display indicating its proper operation.

The properties of the program selection apparatus obtained in accordance with the invention may be summarized by saying that the inputting takes place in the form of multiple-digit coded numbers; that these coded numbers aquire a multiplicity of meanings such as main program number, program parameter, or, in an automatic washing machine, washing temperature, or program times; that each individual input is continuously fed back to the appliance user; that each inputted coded number is made visible by a multiple-digit numerical display, wherein coded number digit places still to be filled are preferably marked during inputting by a particular request symbol directed to the user; that an incorrect appliance setting is prevented by a dynamic coded number locking means, wherein incorrect or inappropriate coded number digit places leave the appliance setting unchanged and trigger an indication by the signal transducer; that all the set programs and parameters are made visible by the display device; and that an automatic standard setting of the parameters takes place upon the selection of a basic program by inputting the appropriate coded number.

In the drawings, the invention is illustrated with the aid of various embodiments which relate to the operation of an automatic washing machine in particular. However, in fully analogous manner, the invention can also be used in other household appliances, such as clothes dryers, dishwashers or microwave ovens, which are also operated in accordance with a more or less comprehensive program. The program selection apparatus according to the invention is coupled with the control means of the particular appliance with which it is used, in that its control device, which may be particularly in the form of a microcomputer, is either connected with a corresponding control logic unit for the appliance or is integral therewith.

The invention will be better understood as well as further objects and advantages thereof become more apparent from the ensuring detailed description of a preferred embodiment taken in conjunction with the drawings.

BRIEF DESCRIPTION OF THE DRAWINGS

FIG. 2 shows one example for the mode of operation of the display device in the context of the program selection apparatus for FIG. 1; and FIG. 3 is a summary in table form for the possible (x) and standard (o) parameters for controlling an automatic washing machine which are possible for a particular basic program.

FIGS. 4A–C are detailed schematics of the present invention.

FIG. 5 is a schematic circuit which detects closed program switches.

DESCRIPTION OF THE PREFERRED EMBODIMENT

Figure 1:
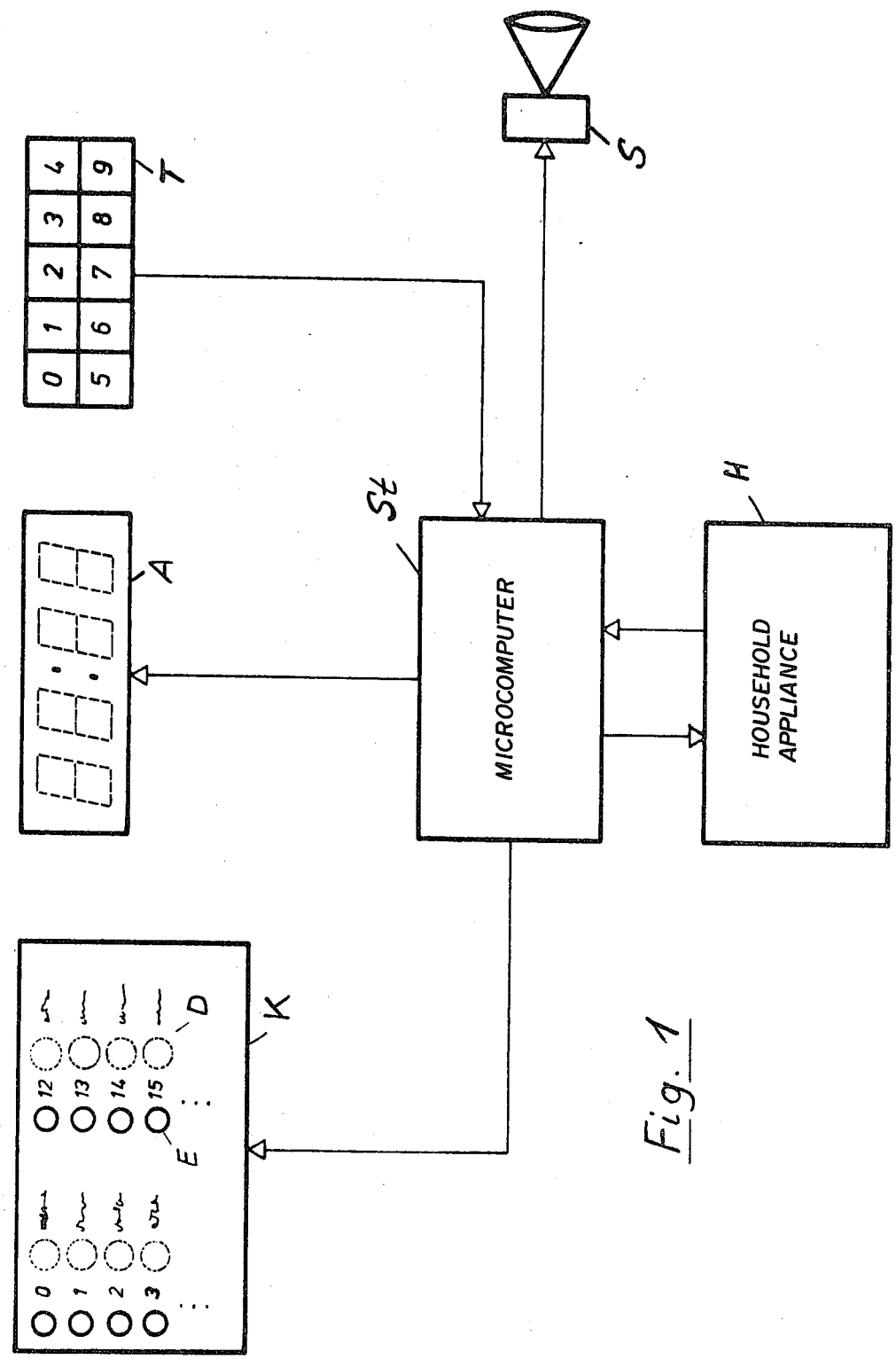
FIG. 1 is a block circuit diagram for the electrical connections between the individual components of a program selection apparatus constructed in accordance with the invention and for its attachment to further structural stages of the associated household appliances.

Turning now to the block circuit diagram of FIG. 1, there will be seen an input keyboard T having ten individual input keys for the numerals from 0 through 9, a display field A embodied as a four-digit segmental display, a coded number board K, a signal transducer S formed as a buzzer and finally a household appliance H, which may be, for example, an automatic washing machine, all of them being connected to a control device St in the form of a microcomputer. The coded number board K has one display element E and one associated designation D for each possible program and parameter. Luminous diodes are particularly suitable as the display elements E, and the designations D may also be embodied in the form of luminous symbols.

The appliance H is operated according to one of a plurality of possible programs, each of which can be selected by means of a multiple-digit coded number. In the illustrated example, a control means is provided which uses two-digit coded numbers. However, three- or four-digit numbers can also easily be used, which produces a further multiplication of the selection possibilities for programs and parameters.

The input of the coded numbers is accomplished with the aid of the input keyboard T, which is coupled via the control device St with the display board A and the coded number board K, which together comprises the display device through which the particular program selected and the parameters set at a given moment are made visible.

Figure 2:
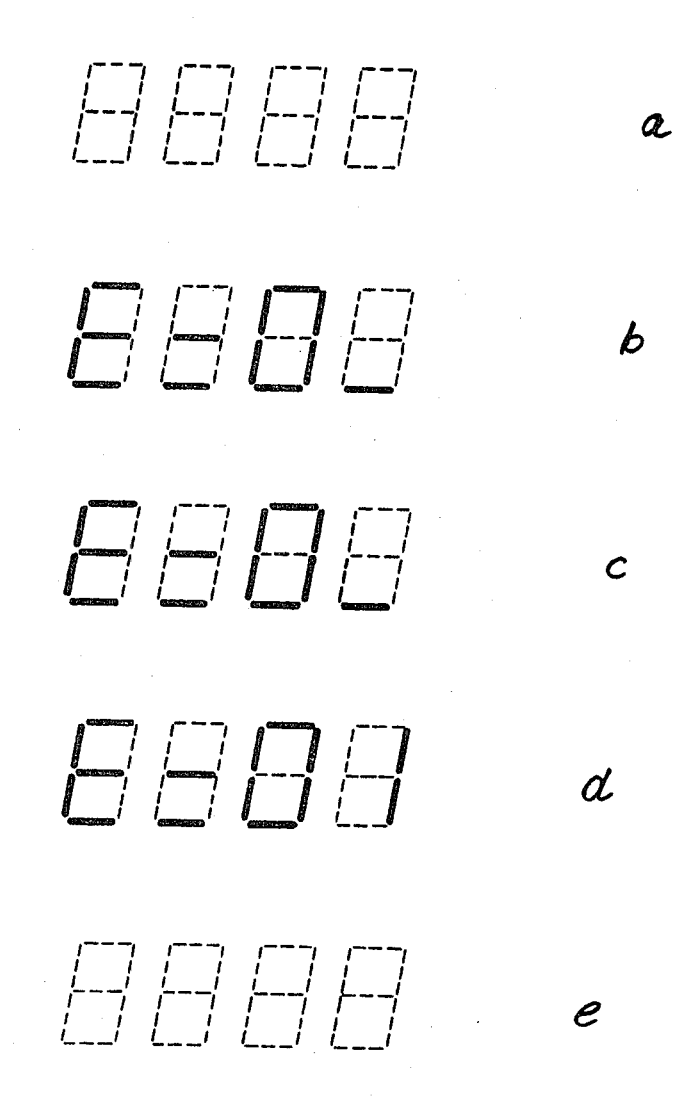

The course of the program inputting and its display on the display board A are shown in FIG. 2 for the example of the inputting of a program with the coded number 01. Before the coded number inputting begins, any arbitrary display is visible on the display board A, as is shown in line a of FIG. 2 by a blank display. During and after the actuation of one key of the keyboard T for the input of the first digit of the selected code number, a particular display pattern appears on the display board A which, first, feeds back the first inputted digit of the coded number to the appliance user and, second, requests him by means of a request symbol to input the still-unoccupied digit places of the coded number.

After the input of the last digit of the coded number, the particular display pattern on the display board A disappears, and the original display reappears there as is shown in line e of FIG. 2. Lines b, c and d of FIG. 2 correspond to the intermediate steps during the inputting of the coded number 01, with lines b and c representing the status during and after the inputting of the 0 and line d representing the input after the 1 has been fed in. In the illustrated case, the lowermost crossbar of the 7-segment display character is chosen as the request symbol for requesting the input of the second digit fo the coded number, in this example the 1.

A program or a program parameter is selected or set by inputting a coded number, with the actuation of the input keyboard T causing a continuous display in accordance with FIG. 2 on the display field A, and after this has been terminated, an appropriate marking on the corresponding display element E of the coded number board K, whenever the inputted coded number represents a correct selection. An impermissible coded number, on the other hand, causes a triggering of the signal transducer S. This signal triggering takes place already during the inputting of the incorrect or impermissible coded number digit itself, so that the appliance user can ascertain the input error by means of the input display on the display field A.

With the input of a first correct coded number which designates a program, all the necessary program parameters are additionally and automatically set, so that the input of further coded numbers is only necessary whenever other parameters are desired for a particular case than the standardized and normally most favorable ones. In the chart of FIG. 3, in the form of a table of the presets and the locks, thre is an illustration using the example of an automatic washing machine in which final treatments (spinning and so forth) and washing temperatures are automatically set when the basic program is selected, using the coded numbers 01 through 06 and 10 through 16. The corresponding data are marked in FIG. 3 by the symbol of a circle, which characterizes the state of standard presetting.

In order to prevent incorrect operations, dynamic code number locking is provided, by means of which a distinction is made between selectable code numbers (shown by the symbol x in FIG. 3) and blocked code numbers (symbol .). There is a basic state before the beginning of the program input, and several active states, which arise in accordance with the first inputted (correct) coded number. In the basic state, all the coded numbers are selectable which correspond to a program which can be performed (that is, which is appropriate) for the particular appliance H in question. This gives the appliance user the opportunity to observe an efficient series of steps in inputting the program, such as first inputting a program, such as first inputting a program and then inputting changes or additions to this program.

In the table of FIG. 3, the basic state after a previous program setting has been cleared is shown in the first line 00 (00=clear). The other lines 01 through 06 and 10 through 16 show the active states after the inputting of the code numbers 01 through 06 and 10 through 16. The table of FIG. 3 shows that in the basic state, all the basic programs 01 through 06 and 10 through 16 are selectable—but no parameters are selectable. In the active states, in contrast, the selection possibilities are substantially restricted. The code numbers 14 through 16 represent a special case because they can serve not only to initiate a short, independent program when they are selected in the basic program (that is, when they represent the first code number accepted), but also, as shown in FIG. 3, to vary predetermined program parameters of the main programs 01 through 06, when they are selected as the second or subsequent code number accepted after the selection of a main program 01 through 06. This is indicated as selectable by the "x" at intersections between the lines 01 through 06 and the columns 14 through 16.

Figure 4B:
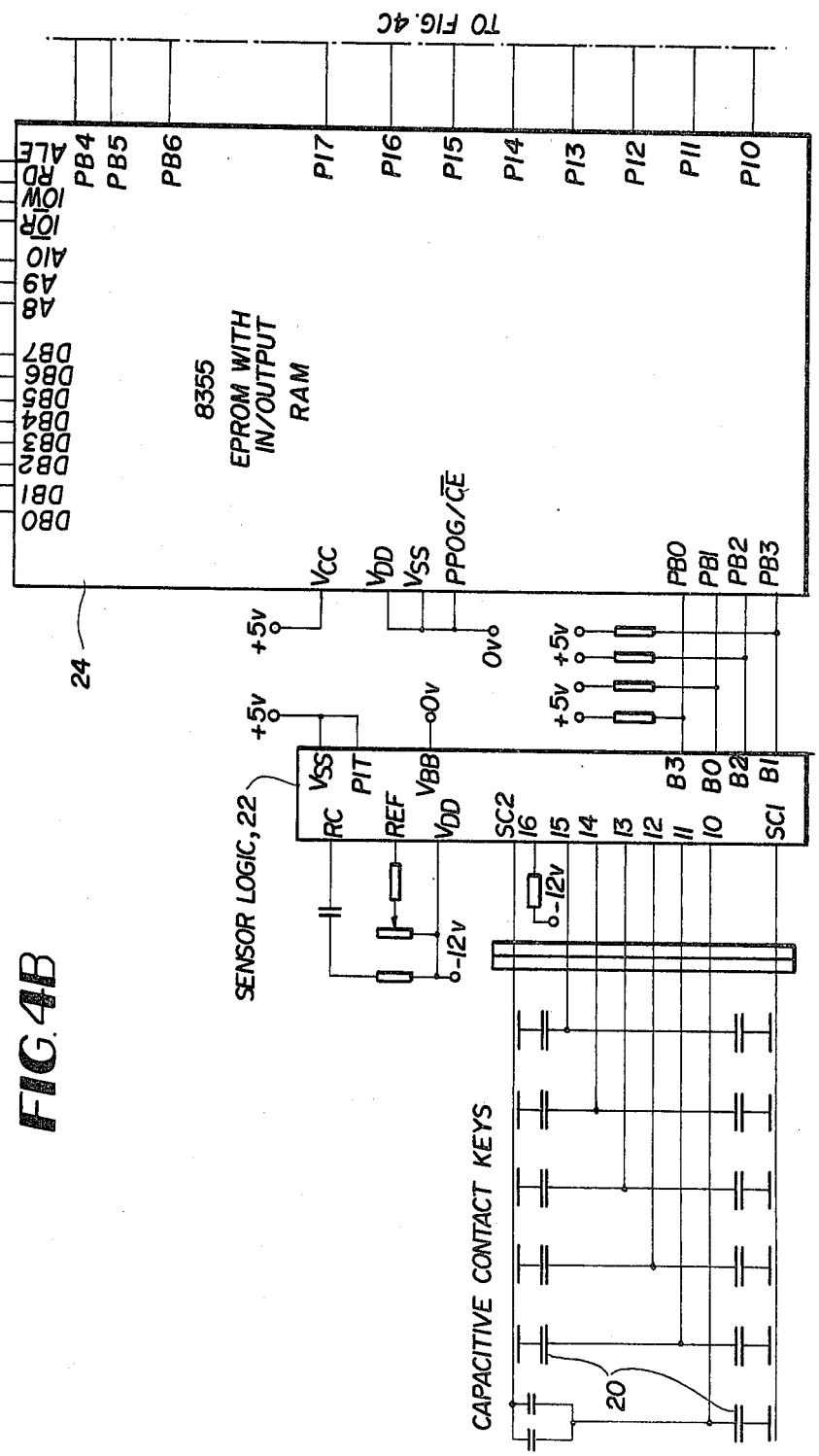
Figure 4C:
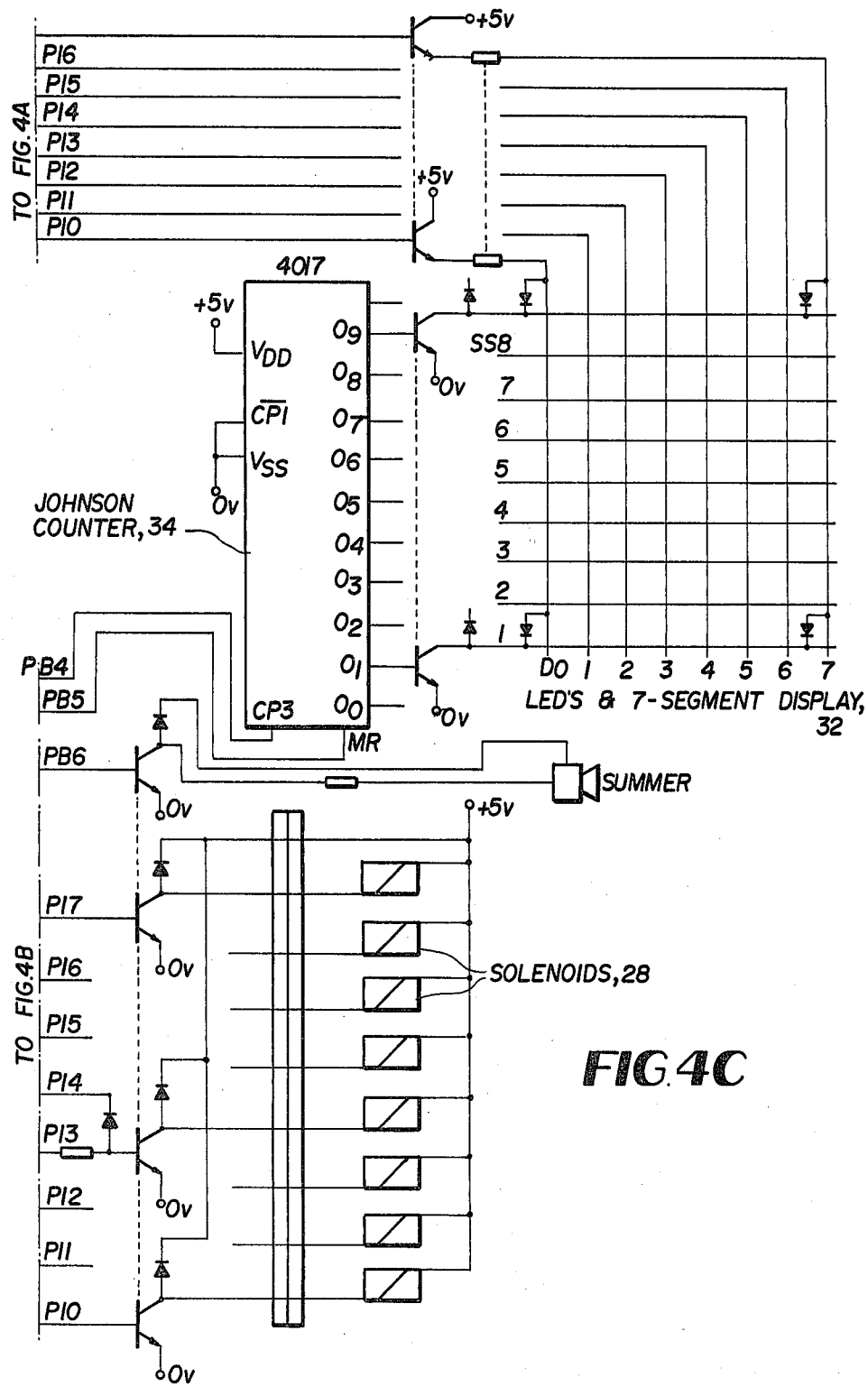

FIG. 4 shows a schematic of the present invention. Capacitive contact keys 20 are provided to allow the operator to select parameters for the household appliance H. These keys 20 comprise the input selector T of FIG. 1. Manipulation of the keys 20 is detected and coded by the sensor logic circuit 22 which is an Intel S9262. The selected, coded parameter signal, generated by sensor logic circuit 22 is received by a RAM 24 in which various operating characteristics of the household appliance H are stored. The microcomputer RAM 24 has stored therein the table of FIG. 3 in binary form. There are two stored tables. The first table contains the several "presets" as marked by an "o" in FIG 3, whereas the second table includes the allowable program changes (selectables) as marked by "x" in FIG. 3. Every "x" and every "o" from FIG. 3 are marked in the corresponding stored tables by an "0", whereas the points from FIG. 3 are indicated by a "1". The bit pattern of the primary program which is stored, for the most part in ROM 26, is combined with the bit pattern of the introduced coded number through an AND circuit within the RAM 24. If the combination results in a value $\neq 0$, then the newly introduced coded number is not allowed for the respective primary program. If however, the logical combination results in "0", then the newly introduced coded number is accepted either for an additional function or for another primary program if it is introduced in the basic state. Coded numbers higher than 16 are processed in the microcomputer as hexadecimal numbers, since they are always interpreted in the ROM 16 as temperature values. Calculation is made to detect whether they are within the allowable minimum and maxiumum borders. Every accepted additional function is stored as a bit flag and the set temperature is stored as hexadecimal number in the RAM.

The ROM/RAM circuit 24/26 controls the activation of solenoids 28 located within the household appliance H. For instance, the ROM/RAM 24, 26 will energize, in a predetermined sequence, the solenoids which control the water valves, pump, and heater in a washing machine.

Also connected to the ROM 26 are temperature sensor switches, imbalance sensor switches,, etc. at 28 which command the RAM/ROM 24, 26 to shut off the household appliance H if predetermined levels of operation are exceeded. Test switches 30 are also provided which act in typical fashion to determine if the ROM/RAM is in operational order.

The display board A comprises a matrix 32 of light emitting diodes (LEDs) which are arranged in two sets of lines and columns one LED being located at each crossing point of the said lines and columns. In the said matrix 4×8 LEDs in the first four columns form four 7-segment display characters plus dot, whereas the four other columns are composed of 4×8 single LED indicators for the code number board K.

The microcomputer periodically switches through the digit drivers in the lines D 0 to D 7 thus activating the columns in the LED matrix. The corresponding LED-information (0=Led off and 1=LED on) is delivered to the segment outputs S1 to S8.

Generatng a line of enlighted LEDs from the lower left corner of the LED matrix to its upper right corner is effected by the following sequence: First every segment output S1 to S8 is switched off, then the digit output D 0 and the segment output S8 are switched on. Consequently, current is flowing from the segment driver coupled to segment output S1 through the lower and left LED in the matrix to the digit driver coupled to the digit output Do0, and thus the lower and left LED is enlightened. One ms later all the segment outputs are switched off again. Then the digit scan is advanced by one unit which means that the digit output Do0 shows the output 0, whereas the digit output Do1 shows the output 1. The segment information on the next line is delivered with only the segment output So1 being switched on. Again one ms later the line coupled to digit output Do2 is enabled, and the LED of segment column 2 is switched on which means that segment output So2 shows the output 1.

Each 7-segment display character consists of eight LEDs wich form an "8" and a dot. Each segment is processed as a LED and may be switched on or off individually to form the desired character which may vary between 0 and 9, or may correspond to some special sign like "=" or "E" or ".". Though the LEDs are not enlightened simultaneously, but are enlightened in the order of one column following the other one by multiplexing, the inertia of the human eye makes the observer see all the corresponding LEDs and segments in their "on"-state without any flicker, since the cycle of their enlightment is shorter than 100 times/second. The Johnson-type counter 34 is also used in the multiplexing of the LED as shown in the drawing. A voltage supply circuit is shown at 36 which provides-12, 0, and 5 v taps to drive the microcomputer 24/26.

The switch matrix shown in FIG. 5 is scanned in the same way as described above for the LED matrix by means of switch scan outputs SS∅ to SS2 which serve for sensing the switch inputs S1∅ to S13 associated with keyboard T.

Assuming that the lower right switch is depressed, than at the first scan with the outputs at SS∅ being 1, at SS1 being ∅ and at SS2 being ∅ all the scan inputs are high which means that no key is depressed. The same applies to the second scan with the outputs at SS∅ being ∅, at SS1 being 1 and at SS2 being ∅. With the third scan, however, when the output at SS∅ is ≠, the output at SS1 is ∅ and the output at SS2 is 1, current may flow through the rightmost pull-up resistor and through the lower right switch to the lowest driver coupled to SS2. Thus the scan input S13 will be pulled down, and that will be detected by the microcomputer 24/26 for indicating the closure of the corresponding switch.

The foregoing relates to a preferred embodiment of the invention, it being understood that other embodiments are variants thereof are possible within the spirit and scope of the invention, the latter being defined by the appended claims.

What is claimed and desired to be secured by Letters Patent of the United States:

1. A program selection apparatus for program-controlled household appliances, such as washing machines, a numeral keyboard having keys for the input of program specifications consisting of coded number digits, a control device, a display device coupled to said numeral keyboard for a continuous display of the program specifications inputted by actuating the various keys of the numeral keyboard, a signal transducer for indicating faults in inputting number digits forming the program specifications, and, a control device coupling said numeral keyboad to said display device and to said signal transducer for subsequently and continuously displaying the entry of the various number digits of a program specification inputted through actuating corresponding keys of the numeral key board and on inputting another number digit not compatible in the context of the programmability of the associated household appliance with the number digits already inputted and displayed triggering said signal transducer for indicating a fault in programming and preventing the said not compatible number digit from becoming effective for the program selection, the improvement comprising, said control device adapted to always input a same number of digits for forming a particular program specification upon the inputting of the first coded number digit, whereby said control device triggers said display device to indicate request symbols requesting the subsequent inputting of the remaining coded number digits belonging to a complete coded program specification.

2. An apparatus in accordance with claim 1 wherein said display device is provided with a multiple-digit display board having a number of digit places corresponding at least to the number of the coded number digits belonging to a complete coded number and a coded number board having one display element for each possible coded number.

3. An apparatus in accordance with claim 2 including one data designation corresponding to the appropriate coded number or its content associated with each said display element on said coded number board.

4. An apparatus in accordance with claim 2 wherein said display board is in the form of a multiple-digit luminous display and wherein said display elements on said coded number board comprise luminous diodes.

5. An apparatus in accordance with claim 1 wherein said signal transducer is of the type for producing an acoustical signal.

* * * * *